(12) United States Patent
Maeda et al.

(10) Patent No.: US 11,679,556 B2
(45) Date of Patent: Jun. 20, 2023

(54) ADDITIVE MANUFACTURING SYSTEMS AND METHODS FOR THE SAME

(71) Applicant: PALO ALTO RESEARCH CENTER INCORPORATED, Palo Alto, CA (US)

(72) Inventors: Patrick Y. Maeda, San Jose, CA (US); Joanne L. Lee, Palo Alto, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 0 days.

(21) Appl. No.: 17/114,607

(22) Filed: Dec. 8, 2020

(65) Prior Publication Data

US 2022/0176630 A1 Jun. 9, 2022

(51) Int. Cl.
 *B29C 64/268* (2017.01)
 *B33Y 10/00* (2015.01)
 (Continued)

(52) U.S. Cl.
 CPC .......... *B29C 64/268* (2017.08); *B22D 23/003* (2013.01); *B29C 64/112* (2017.08); *B29C 64/286* (2017.08); *B29C 64/393* (2017.08); *B33Y 10/00* (2014.12); *B33Y 30/00* (2014.12); *B33Y 50/02* (2014.12); *B33Y 70/00* (2014.12); *B29K 2101/12* (2013.01)

(58) Field of Classification Search
 CPC ... B29C 64/268; B29C 64/112; B29C 64/393; B29C 64/286; B33Y 30/00; B33Y 50/02; B33Y 70/00; B29K 2101/12
 See application file for complete search history.

(56) References Cited

U.S. PATENT DOCUMENTS 4,632,170 A 12/1986 Pöhl
5,954,112 A 9/1999 Forbes Jones et al.
(Continued)

FOREIGN PATENT DOCUMENTS

CN 106563804 A 4/2017
CN 108857031 A 11/2018
(Continued)

OTHER PUBLICATIONS

Bordatchev et al., "Performance of Laser Polishing in Finishing of Metallic Surfaces," Int. J. Adv. Manuf. Technol (2014) 73, 35-52.
(Continued)

*Primary Examiner* — Larry W Thrower
(74) *Attorney, Agent, or Firm* — MH2 Technology Law Group LLP (57) ABSTRACT

Additive manufacturing devices and methods for the same are provided. The additive manufacturing device may include a stage configured to support a substrate, a printhead disposed above the stage, and a targeted heating system disposed proximal the printhead. The printhead may be configured to heat a build material to a molten build material and deposit the molten build material on the substrate in the form of droplets to fabricate the article. The targeted heating system may be configured to control a temperature or temperature gradient of the droplets deposited on the substrate, an area proximal the substrate, or combinations thereof.

22 Claims, 6 Drawing Sheets

(51) Int. Cl.
- B33Y 30/00 (2015.01)
- B33Y 50/02 (2015.01)
- B33Y 70/00 (2020.01)
- B29C 64/112 (2017.01)
- B29C 64/393 (2017.01)
- B29C 64/286 (2017.01)
- B22D 23/00 (2006.01)
- B29K 101/12 (2006.01)

(56) References Cited

U.S. PATENT DOCUMENTS

| | | | |
|---|---|---|---|
| 9,616,494 B2 | 4/2017 | Vader et al. | |
| 10,040,119 B2 | 8/2018 | Vader et al. | |
| 2005/0201429 A1* | 9/2005 | Rice | H01S 3/2383 372/27 |
| 2015/0273863 A1 | 10/2015 | Stowe et al. | |
| 2016/0318130 A1 | 11/2016 | Stempfer et al. | |
| 2017/0087632 A1 | 3/2017 | Mark | |
| 2017/0145586 A1* | 5/2017 | Xiao | B33Y 30/00 |
| 2017/0182763 A1 | 6/2017 | Sugai | |
| 2017/0252827 A1 | 9/2017 | Sachs et al. | |
| 2017/0361530 A1* | 12/2017 | Liu | B22F 10/366 |
| 2018/0161873 A1 | 6/2018 | Brown et al. | |
| 2021/0162493 A1* | 6/2021 | Herrmann | B33Y 10/00 |
| 2022/0176618 A1 | 6/2022 | Maeda et al. | |

FOREIGN PATENT DOCUMENTS

| | | |
|---|---|---|
| EP | 2998059 A1 | 3/2016 |
| EP | 3380265 A1 | 10/2018 |
| EP | 3708279 A1 | 9/2020 |
| EP | 3831519 A1 | 6/2021 |
| JP | 2013125773 A3 | 6/2013 |
| WO | 2016/130709 A1 | 8/2016 |
| WO | 2017/091363 A1 | 6/2017 |
| WO | 2019/102371 A1 | 5/2019 |

OTHER PUBLICATIONS

Chao et al., "Remelting and bonding of deposited aluminum alloy droplets under different droplet and substrate temperatures in metal droplet deposition manufacture," International Journal of Machine Tools & Manufacture 69 (2013) 38-47.

Dezfoli et al., "Determination and controlling of grain structure of metals after laser incidence: Theoretical approach," Nature Scientific Reports, Jan. 30, 2017, 1-11.

Marrey et al., A Framework for Optimizing Process Parameters in Powder Bed Fusion (PBF) Process Using Artificial Neural Network (ANN), 47th SME North American Manufacturing Research Conference, NAMRC 47, 2019, 1-11.

Schmidt et al., "Laser polishing of aluminum by remelting with high energy pulses," Mat.-wiss. u. Werkstofftech. 2015, 46, No. 7, 686-691.

Extended European Search Report dated May 11, 2022, in corresponding European Application No. 21210618.1, 10 pages.

Extended European Search Report dated May 11, 2022, in related European Application No. 21210617.3, 10 pages.

Marshall et al., "Handbook of Optical and Laser Scanning," Second Edition, 2012, Chapter 4—Polygonal Scanners Components, Performance, and Design, 35 pages.

Pasquet et al., "Laser Cleaning of Oxidized Fe-alloys," Surface Modification Technologies XIV, ASM International, Materials Park, Ohio, 2000, pp. 1-7.

Suebka, "Laser Cleaning of Aluminium Alloys," Thesis submitted to the University of Manchester for the degree of Doctor of Philosophy in the Faculty of Science and Engineering, 2018, 252 pages.

Zhang et al., "Effect of Pulsing Parameters on Laser Ablative Cleaning of Copper Oxides," Journal of Applied Physics 99, 1 (2006) 11 pages.

Extended European Search Report for European Application No. 20208747.4 dated May 3, 2021, 9 pages.

Karampelas et al., "Drop-on-Demand 3D Metal Printing," Informatics, Electronics and Microsystems: TechConnect Briefs, vol. 4, May 14, 2017, pp. 153-155.

Sukhotskiy et al., "Magnetohydrodynamic Drop-on-Demand Liquid Metal 3D Printing," Solid Freeform Fabrication 2017: Proceedings of the 28th Annual International Solid Freeform Fabrication Symposium—An Additive Manufacturing Conference, Aug. 2017, pp. 1806-1811.

Vader Systems MK1 Printer, Operator Manual 1.0, last revised Mar. 19, 2018, 114 pages.

* cited by examiner

ADDITIVE MANUFACTURING SYSTEMS AND METHODS FOR THE SAME

TECHNICAL FIELD

The presently disclosed embodiments or implementations are directed to additive manufacturing systems and method for the same.

BACKGROUND

Liquid metal jet printing, such as magnetohydrodynamic (MHD) liquid metal jet printing, includes ejecting liquid or molten metal drops from a printhead to a substrate, which may be a heated stage or a previously deposited metal, to form a workpiece or article. Generally, liquid metal jet printing includes utilizing a direct current pulse applied by an electromagnetic coil to expel molten metal drops toward the substrate. As the metal drops contact the substrate, the metal drops cool to form the article. While liquid metal jet printing has made great progress, the articles fabricated from conventional liquid metal jet printing systems often exhibit inconsistencies with respect to build strength, adhesion, porosity, surface finish, cracking, fractures, z-height errors, or the like.

In view of the foregoing, secondary or post-printing processes, such as machining and finishing, are often implemented to address the inconsistencies in the articles fabricated from conventional liquid metal jet printing systems. The post-printing processes, however, greatly reduces productivity and correspondingly increases cost of fabricating the article via liquid metal jet printing.

What is needed, then, are improved liquid metal jet printing systems and methods for the same.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure may provide an additive manufacturing device for fabricating an article. The additive manufacturing device may include a stage configured to support a substrate, a printhead disposed above the stage, and a targeted heating system disposed proximal the printhead. The printhead may be configured to heat a build material to a molten build material and deposit the molten build material on the substrate in the form of droplets to fabricate the article. The targeted heating system may be configured to control a temperature or temperature gradient of the droplets deposited on the substrate, an area proximal the substrate, or combinations thereof.

In some examples, the targeted heating system may be configured to heat the droplets deposited on the substrate, the area proximal the substrate, or combinations thereof to a temperature of about ±10% to about ±40% of a melting point of the build material.

In some examples, the printhead and the targeted heating system may be coupled with one another.

In some examples, the targeted heating system may include one or more lasers.

In some examples, the one or more lasers may include an irradiance of from about 1,000 W/cm$^2$ to about 10,000 W/cm$^2$.

In some examples, the one or more lasers may include a high power laser imager.

In some examples, the high power laser imager may include a 1D imager or a 2D imager.

In some examples, the targeted heating system may be configured to operate at temperatures of from greater than or equal to about 300 □C to less than or equal to about 600 □C.

In some examples, the targeted heating system may include a laser system.

In some examples, the laser system may include: a fiber laser; a fiber coupled laser module; an output fiber coupled with the fiber coupled laser module; a collimator disposed downstream of the fiber output; a polarization rotator disposed downstream of the collimator; a variable retarder disposed downstream of the collimator; and a wave retarder disposed downstream of the variable retarder.

In some examples, the additive manufacturing device may further include: a first polarizer disposed between the collimator and the polarization rotator; a second polarizer disposed between the polarization rotator and the variable retarder; and a third polarizer disposed downstream of the wave retarder.

In some examples, the polarization rotator may be disposed upstream of the variable retarder and the wave retarder.

In some examples, the additive manufacturing device may further include: a first polarizer disposed between the collimator and the variable retarder; a second polarizer disposed between the wave retarder and the polarization rotator; and a third polarizer disposed downstream of the polarization rotator.

In some examples, the variable retarder and the wave retarder may be disposed upstream of the polarization rotator.

In some examples, the targeted heating system may include a monogon system, the monogon system comprising one or more monogon scanners, one or more Galvo mirrors, or combinations thereof.

In some examples, the monogon system may include a monogon scanner. The monogon scanner may be substantially free of a reflective coating.

In some examples, the additive manufacturing device may further include a monitoring system. The monitoring system may be configured to monitor a portion of the additive manufacturing device.

In some examples, the monitoring system may include a pyrometer configured to measure a temperature of the substrate, the area proximal the substrate, or combinations thereof.

In some examples, the additive manufacturing device may further include: a computing system operably coupled with the printhead and the targeted heating system; and a monitoring system operably coupled with the computing system and configured to monitor the additive manufacturing device.

In some examples, the build material may include one or more metals or metal alloys. The one or more metals or metal alloys may include one or more of aluminum, an aluminum alloy, brass, bronze, chromium, a cobalt-chrome alloy, copper, a copper alloy, an iron alloy, nickel, a nickel alloy, a nickel-titanium alloy, stainless steel, tin, titanium, a titanium alloy, gold, silver, molybdenum, tungsten, or combinations thereof.

In some examples, the build material may include one or more polymers. The one or more polymers may include one or more of acrylonitrile butadiene styrene (ABS), polycarbonate (PC), polylactic acid (PLA), high density polyethylene (HDPE), polyphenylsulfone (PPSU), poly(meth)acrylate, polyetherimide (PEI), polyether ether ketone (PEEK), high impact polystyrene (HIPS), thermoplastic polyurethane (TPU), a polyamide, composites thereof, or combinations thereof.

The present disclosure may provide a method for fabricating an article with any one or more of the additive manufacturing devices disclosed herein. The method may include heating the build material in the printhead to the molten build material; depositing the molten build material on the substrate in the form of droplets; and heating the droplets deposited on the substrate, an area proximal the substrate or combinations thereof.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

DETAILED DESCRIPTION

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

Reference will now be made in detail to exemplary embodiments of the present teachings, examples of which are illustrated in the accompanying drawings. Wherever possible, the same reference numbers will be used throughout the drawings to refer to the same, similar, or like parts.

The present disclosure is directed to additive manufacturing devices or 3D printers and methods for the same. Particularly, the present disclosure is directed to targeted heating systems for the 3D printers and methods for the same. Forming structures with molten metal droplets is a complex thermo-fluidic process that involves re-melting, coalescence, cooling, and solidification. Voids and cold lap (lack of fusion) are caused by poor re-melting and insufficient metallurgical bonding under inappropriate temperatures at the interface formed between the molten metal droplets and previously deposited material or substrates (e.g., droplets). The interfacial temperature is determined primarily by the droplet temperature and the surface temperature of the previously deposited material or substrate. Obtaining and retaining accurate part shape and z-height are also negatively impacted by the same factors. An interfacial temperature that is too low results in the formation of voids and cold laps from insufficient re-melting and coalescence. For an interfacial temperature that is too high, the new droplets flow away from the surface of previously deposited material before solidification, which leads to the malformation of part shape and z-height error. The interfacial temperature can be affected by the initial droplet temperature, the build part surface temperature, the build plate temperature, drop frequency, and part z-height. It can be controlled at some level through process parameter optimization, but the thermal processes involved may be too slow to keep up with the changes and dynamics that occur during part printing that can result in unacceptable interfacial temperatures. As further described herein, the targeted heating systems may be capable of or configured to modify interfacial temperatures and/or temperature gradients of a substrate and/or an area proximal the substrate to control grain size, growth, and/or structure of the metal forming an article prepared by the 3D printer to address the aforementioned issues. For example, the targeted heating system may be capable of or configured to modify interfacial temperatures and/or temperature gradients of a melt pool to control grain size, growth, and/or structure of the metal forming the article, thereby improving build strength, adhesion, porosity, and/or surface finish, and preventing cracks and fractures in the article.

Figure 1:
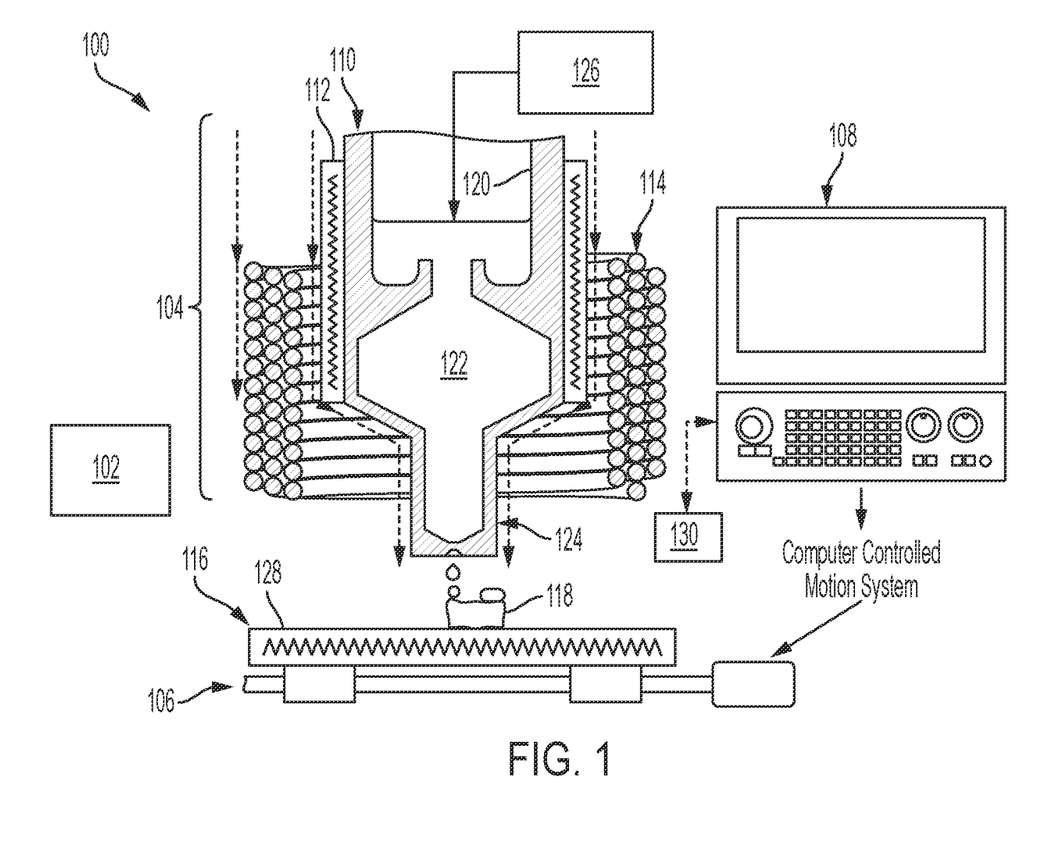
FIG. 1 illustrates a schematic cross-sectional view of an exemplary additive manufacturing layering device or 3D printer incorporating a targeted heating system, according to one or more embodiments disclosed.

FIG. 1 illustrates a schematic cross-sectional view of an exemplary additive manufacturing layering device or 3D printer 100 incorporating a targeted heating system 102, according to one or more embodiments. The 3D printer 100 may be a liquid metal jet printing system, such as a magnetohydrodynamic (MHD) printer. It should be appreciated, however, that any additive manufacturing device may utilize the targeted heating system 102 and methods disclosed herein. The 3D printer 100 may include a printhead 104, a stage 106, a computing system 108, the exemplary targeted heating system 102, or any combination thereof. The computing system 108 may be operably and/or communicably coupled with any one or more of the components of the 3D printer 100. The computing system 108 may be capable of or configured to operate, modulate, instruct, receive data from, or the like from any one or more of the components of the 3D printer 100. The printhead 104 may include a body 110, which may also be referred to herein as a pump chamber, one or more heating elements (one is shown 112), one or more metallic coils 114, or any combination thereof, operably coupled with one another. As illustrated in FIG. 1, the heating elements 112 may be at least partially disposed about the body 110, and the metallic coils 114 may be at least partially disposed about the body 110 and/or the heating elements 112. As used herein, a substrate 116 may refer to a surface of the stage 106, a previously deposited metal (e.g., metal droplets), an article 118 fabricated from the 3D printer 100 or a portion thereof, a platen 128, such as a heated platen or build plate disposed on the stage 106, and/or respective surfaces thereof. As illustrated in FIG. 1, the substrate 116 may be disposed on or above the stage 106 and below the body 110. The body 110 may have an inner surface 120 defining an inner volume 122 thereof. The body 110 may define a nozzle 124 disposed at a first end portion of the body 110.

In an exemplary operation of the 3D printer 100 with continued reference to FIG. 1, a build material (e.g., metal) from a source 126 may be directed to the inner volume 122 of the body 110. The heating elements 112 may at least partially melt the build material contained in the inner volume 122 of the body 110. For example, the build material may be a solid, such as a solid metal, and the heating elements 112 may heat the body 110 and thereby heat the build material from a solid to a liquid (e.g., molten metal). The metallic coils 114 may be coupled with a power source (not shown) capable of or configured to facilitate the deposition of the build material on the substrate 116. For example, the metallic coils 114 and the power source coupled therewith may be capable of or configured to generate a magnetic field, which may generate an electromotive force within the body 110, thereby generating an induced electrical current in the molten metal disposed in the body 110. The magnetic field and the induced electrical current in the molten metal may create a radially inward force on the liquid metal, known as a Lorentz force, which creates a pressure at the nozzle 124. The pressure at the nozzle 124 may expel the molten metal out of the nozzle 124 toward the substrate 116 and/or the stage 106 in the form of one or more drops to thereby form at least a portion of the article 118.

The targeted heating system 102 may be capable of or configured to heat at least a portion of the substrate 116 and/or an area proximal the substrate 116. For example, the targeted heating system 102 may be capable of or configured to heat at least a portion of the platen 128, a portion of the article 118, respective surfaces thereof, and/or areas proximal thereto. The targeted heating system 102 may heat the portion of the substrate 116 before, during, and/or after deposition of the one or more drops of the molten metal on the substrate 116 and/or an area proximal the substrate 116. In an exemplary embodiment, the targeted heating system 102 heats the portion of the substrate 116 before and/or during the deposition of the drops on the substrate 116. It should be appreciated that the deposition of the drops on the substrate 116 may create or form a melt pool on the substrate 116, and the targeted heating system 102 may be capable of or configured to at least partially modulate (e.g., increase, decrease, alter, etc.) an interfacial temperature or a temperature gradient of the melt pool to thereby control one or more properties of the resulting solid metal forming the article 118. For example, modulating the temperature gradient of the melt pool may allow the 3D printer 100 to control a grain size, grain growth, grain structure, grain orientation, and/or grain boundaries, of the resulting solid metal forming the article 118. It should be appreciated that metal grain formation, structure, and/or properties (e.g., size, growth, orientation, boundaries, etc.) may at least partially determine one or more mechanical properties of the resulting portion of the article 118. For example, the grain formation and/or structure may at least partially determine a yield stress, ductility, hardness, fatigue life, or combinations thereof, of the resulting solid metal forming the article 118. As such, the targeted heating system 102 may be capable of or configured to at least partially heat the portions of the substrate 116 to thereby controls one or more properties of the solid metal forming the article 118.

The targeted heating system 102 may also be capable of or configured to reheat or re-melt a previously deposited drop or section of the article 118 to control the interfacial temperature and/or temperature gradient of the melt pool as the molten metal drops and the previously deposited metals are coalescing to thereby improve the mechanical and/or build qualities of the article 118. It should be appreciated that an amount of heat or thermal energy needed to sufficiently control the temperature gradient of the melt pool may be minimal as a temperature of the article 118 and/or the melt pool or the coalescing region thereof is already maintained at a relatively high temperature. As such, the targeted heating system 102 may be cost effectively operated and provide sufficient thermal energy to control the temperature gradient of the melt pool. It should further be appreciated that the targeted heating system 102 may be operated in an in-line manner such that productivity is not reduced. For example, the targeted heating system 102 may be operated alongside the other components of the 3D printer 100 to provide articles 118 with improved properties and without an off-line secondary or post-printing process.

In addition to the foregoing, the targeted heating system 102 may be capable of or configured to at least partially heat a portion of the substrate 116 near or proximal the deposition of the drops and/or near or proximal the melt pool. For example, the targeted heating system 102 may be capable of or configured to at least partially heat a portion of the substrate 116 adjacent to or outside of the deposition of the drops and/or the melt pool. It should be appreciated that heating the portion of the substrate 116 near, proximal, or adjacent the deposition of the drops and/or the melt pool may reduce surface roughness and/or provide improved surface finishing capabilities as compared to a surface without heating from the targeted hearing system 102.

The targeted heating system 102 may directly heat an area having a diameter of from about 0.025 mm to about 1.0 mm. For example, the output (e.g., laser beam) of the targeted heating system 102 may have a diameter or a major axis of from about 0.025 mm to about 1.0 mm. In at least one embodiment, the output of the targeted heating system 102 may have a diameter or a major axis of from about 0.025 mm, about 0.03 mm, about 0.04 mm, about 0.05 mm, about 0.1 mm, about 0.2 mm, about 0.3 mm, or about 0.4 mm to about 0.5 mm, about 0.6 mm, about 0.7 mm, about 0.8 mm, about 0.9 mm, about 0.95 mm, or about 1 mm.

The substrate 116, the area proximal the substrate 116, and/or near the article 118 being fabricated may be maintained at a temperature of from about 200° C. to about 600° C. For example, the temperature may be from greater than or equal to about 200° C., greater than or equal to about 250° C., greater than or equal to about 300° C., greater than or equal to about 350° C., greater than or equal to about 400° C., greater than or equal to about 450° C., greater than or equal to about 500° C., or greater than or equal to about 550° C., and less than or equal to about 600° C. In another example, the temperature may be from greater than or equal to about 200° C. or greater than or equal to about 300° C. to less than or equal to about 350° C., less than or equal to about 400° C., less than or equal to about 450° C., less than or equal to about 500° C., less than or equal to about 550° C., or less than or equal to about 600° C. It should be appreciated that all or substantially all the components of the targeted heating system 102 may be capable of or configured to operate in the temperatures of the substrate 116, the area proximal the substrate 116, and/or near the article 118.

The targeted heating system 102 may be capable of or configured to heat the substrate 116 and/or the area proximal the substrate 116 to a temperature of at least 60% to about 100% of a melting point of the build material. For example, the targeted heating system 102 may be capable of or configured to heat the substrate 116 and/or the area proximal the substrate 116 to a temperature of at least 60%, at least 65%, at least 70%, at least 75%, at least 80%, at least 85%, at least 90%, or at least 95% to about 100% of the melting point of the build material. In another embodiment, the targeted heating system 102 may be capable of or configured to increase a temperature of the substrate 116 and/or the area proximal the substrate 116 (e.g., a coalescence area or melt pool) about ±10%, ±15%, ±20%, ±25%, ±30%, ±35%, ±40%, ±45%, or ±50% of a melting point of the build material.

In at least one embodiment, the build material may be or include one or more metals and/or alloys thereof. Illustrative build materials may be or include, but are not limited to, aluminum, aluminum alloys, brass, bronze, chromium, cobalt-chrome alloys, copper, copper alloys, iron alloys (Invar), nickel, nickel alloys (Inconel), nickel-titanium alloys (Nitinol), stainless steel, tin, titanium, titanium alloys, gold, silver, molybdenum, tungsten, or the like, or alloys thereof, or any combination thereof. It should be appreciated that the droplet and substrate temperatures will be different for different metals.

In another embodiment, the build material may be or include one or more polymeric materials or polymers, or composites thereof. The polymers may be or include functional polymers. Illustrative functional polymers may include, but are not limited to, heat resistant polymers, conductive polymers, piezoelectric polymers, photosensitive polymers, or any combination thereof. The polymers may also be or include, but are not limited to, polyolefin-based polymers, acryl-based polymers, polyurethane-based polymers, ether-based polymers, polyester-based polymers, polyamide-based polymers, formaldehyde-based polymers, silicon-based polymers, or any combination thereof. For example, the polymers may include, but are not limited to, poly(ether ether ketone) (PEEK), TORLON®, polyamide-imides, polyethylene (PE), polyvinyl fluoride (PVF), polyvinyl chloride (PVC), polyvinylidene fluoride (PVDF), polyvinylidene chloride (PVDC), polychlorotrifluoroethylene (PCTFE), polytetrafluoroethylene (PTFE), polypropylene (PP), poly(1-butene), poly(4-methylpentene), polystyrene, polyvinyl pyridine, polybutadiene, polyisoprene, polychloroprene, styrene-acrylonitrile copolymer, acrylonitrile-butadiene-styrene terpolymer, ethylene-methacrylic acid copolymer, styrene-butadiene rubber, tetrafluoroethylene copolymer, polyacrylate, polymethacrylate, polyacrylamide, polyvinyl acetate, polyvinyl alcohol, polyvinyl butyral, polyvinyl ether, polyvinylpyrrolidone, polyvinylcarbazole, polyurethane, polyacetal, polyethylene glycol, polypropylene glycol, epoxy resins, polyphenylene oxide, polyethylene terephthalate, polybutylene terephthalate, polydihydroxymethylcyclohexyl terephthalate, cellulose esters, polycarbonate, polyamide, polyimide, any copolymers thereof, or any combination thereof. In at least one embodiment, the polymer may be or include an elastomer, synthetic rubber, or any combination thereof. Illustrative elastomeric materials and synthetic rubbers may include, but are not limited to, VITON®, nitrile, polybutadiene, acrylonitrile, polyisoprene, neoprene, butyl rubber, chloroprene, polysiloxane, styrene-butadiene rubber, hydrin rubber, silicone rubber, ethylene-propylene-diene terpolymers, any copolymers thereof, or any combination thereof.

In an exemplary embodiment, the polymer includes acrylonitrile butadiene styrene (ABS), polycarbonate (PC), polylactic acid (PLA), high density polyethylene (HDPE), polyphenylsulfone (PPSU), poly(meth)acrylate, polyetherimide (PEI), polyether ether ketone (PEEK), high impact polystyrene (HIPS), thermoplastic polyurethane (TPU), polyamides (nylon), composites thereof, or combinations thereof.

In at least one embodiment, the 3D printer 100 may include a monitoring system 130 capable of or configured to control and/or monitor one or more components or portions of the 3D printer 100, the formation of the article 118, one or more portions of the substrate 116, one or more areas proximal the substrate 116, and/or the deposition of the droplets. For example, the monitoring system 130 may include one or more illuminators (not shown) capable of or configured to measure droplet, build part, build plate, and substrate temperatures, measure build part shape and z-height, measure droplet size and rate, or the like, or any combination thereof. Illustrative illuminators may be or include, but are not limited to, lasers, LEDs, lamps of various types, fiber optic light sources, or the like, or combinations thereof. In another example, the monitoring system 130 may include one or more sensors (not shown) capable of or configured to measure a temperature of one or more components or portions of the 3D printer 100. Illustrative sensors may be or include, but are not limited to, pyrometer, thermistors, imaging cameras, photodiodes, or the like, or combinations thereof. The monitoring system 130 may also be capable of or configured to provide feedback or communicate with the computing system 108.

In at least one embodiment, any one or more components of the 3D printer 100 may move independently with respect to one another. For example, any one or more of the printhead 104, the stage 106 and the platen 128 coupled therewith, the targeted heating system 102, the monitoring system 130, or any combination thereof may move independently in the x-axis, the y-axis, and/or the z-axis, with respect to any one or more of the other components of the 3D printer 100. In another embodiment, any two or more of the components of the 3D printer 100 may be coupled with one another; and thus, may move with one another. For example, the printhead 104 and the targeted heating system 102 may be coupled with one another via a mount (not shown) such that the movement or translation of the printhead 104 in the x-axis, the y-axis, and/or the z-axis results in a corresponding movement of the targeted heating system 102 in the x-axis, the y-axis, and/or the z-axis, respectively. Similarly, the targeted heating system 102 and the stage 106 may be coupled with one another via a mount (not shown) such that the movement of the targeted heating system 102 in the x-axis, the y-axis, and/or the z-axis results in a corresponding movement of the stage 106 in the x-axis, the y-axis, and/or the z-axis, respectively.

Figure 2:
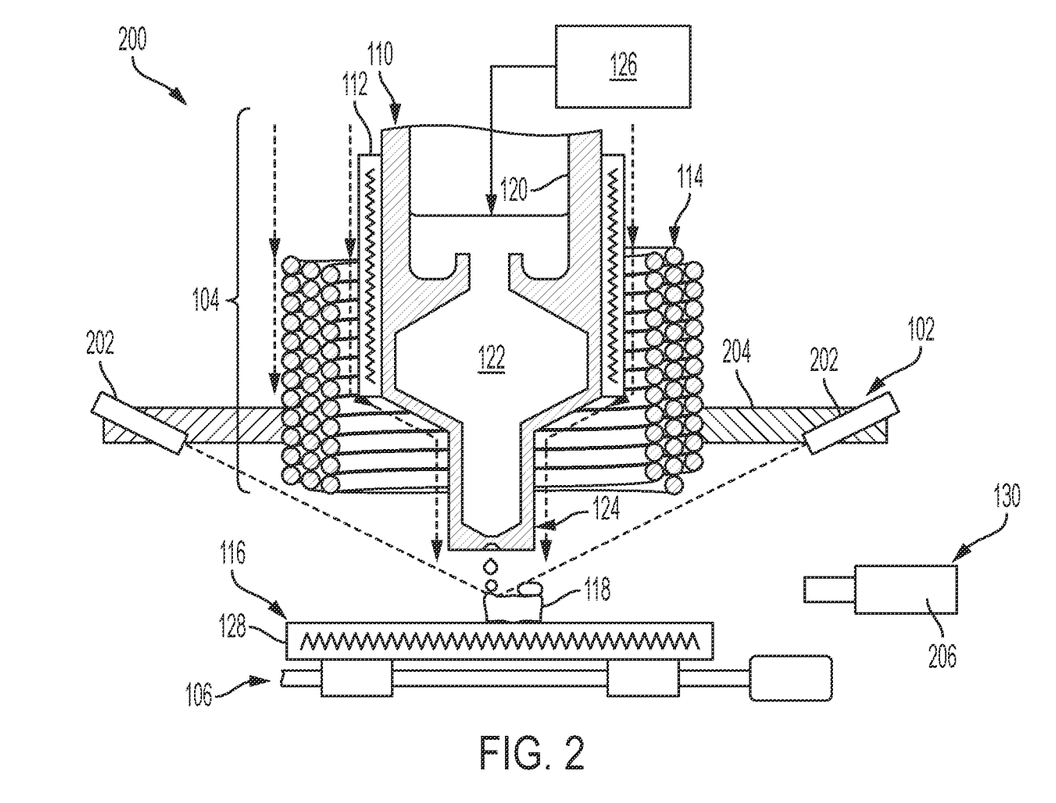
FIG. 2 illustrates a schematic view of another exemplary additive manufacturing layering device or 3D printer incorporating an exemplary targeted heating system, according to one or more embodiments disclosed.

FIG. 2 illustrates a schematic view of another exemplary additive manufacturing layering device or 3D printer 200 incorporating an exemplary targeted heating system 102, according to one or more embodiments. The 3D printer 200 illustrated in FIG. 2 may be similar in some respects to the 3D printer 100 described above and therefore may be best understood with reference to the description of FIG. 1, where like numerals designate like components and will not be described again in detail.

As illustrated in FIG. 2, the targeted heating system 102 of the 3D printer 100 may include one or more lasers (two are shown 202). The lasers 202 may include external optical components like filters, collimating optics, focusing optics and beam shaping optics to achieve desired irradiance levels, irradiance pattern (i.e., circular, elliptical, etc.) and irradiance profiles (i.e., Gaussian, top-hat, doughnut mode, multimode, etc.). As further illustrated in FIG. 2, the lasers 202 may be coupled with the printhead 104 via a mount 204. While FIG. 2 illustrates the lasers 202 of the targeted heating system 102 coupled with the printhead 104, it should be appreciated, as discussed above, that the targeted heating system 102 or the lasers 202 thereof may be coupled with any other component of the 3D printer 200. As illustrated in FIG. 2, any one or more of the lasers 202 may be capable of or configured to direct a laser beam on or proximal the substrate 116 to thereby heat the substrate 116 or a portion thereof.

The lasers 202 of the targeted heating system 102 may be or include any suitable laser that is capable of or configured to sufficiently heat the substrate 116 and/or an area proximal the substrate 116. In at least one embodiment, the type of the lasers 202 utilized may be at least partially dependent on the build material, such as the type of metal being deposited to fabricate the article 118. In another embodiment, the type of the lasers 202 utilized may at least partially depend on a rate at which the drops are deposited on the substrate 116 or the deposition rate.

In at least one embodiment, the laser 202 may be or include, but is not limited to, an in-line high power laser imager capable of or configured to deliver targeted high power laser energy to the substrate 116 and/or an area proximal the substrate 116. The high power laser imager may be a 1D imager or a 2D imager. The in-line high power laser imager may utilize one or more of a high power laser, arrays of independently addressable diode lasers or vertical cavity surface emitting lasers (VCSELs), an illumination optical system, a spatial light modulator, a pixelated spatial light modulator, a projection optical system, or combinations thereof. The illumination optical system may be capable of or configured to shape the laser emission and deliver it onto the spatial light modulator. The projection optical system may be capable of or configured to image the spatial light modulator onto the substrate 116 and/or an area proximal the substrate 116. A pixelated line image or 1D image may be produced with a linear spatial light modular, or linear arrays of diode lasers or VCSELs. Illustrative linear spatial light modulators may be or include, but are not limited to, a Grating Light Valve (GLV), digital Micromirror Device (DMD), a Liquid-Crystal on Silicon (LCOS) spatial light modulator, or the like, or combinations thereof. A pixelated area image or 2D image may be produced with a spatial light modulator or 2D arrays of VCSELs. Illustrative spatial light modulators for producing the 2D image may be or include, but are not limited to, a 2D digital Micromirror Device (DMD), a 2D Liquid-Crystal on Silicon (LCOS) spatial light modulator, or the like, or combinations thereof. The 1D or 2D imager may be capable of or configured to pattern over a line or area to delivery targeted laser energy to more than one droplet location on the substrate 116 and/or an area proximal the substrate 116. The 1D or 2D imager may be capable of or configured to shape the laser beam profile within one or more droplet locations to alter local thermal gradients within the melt pool of the one or more droplets at the substrate 116 and/or proximal an area of the substrate 116. This is especially important for systems that employ printheads with multiple independent ejectors that enable parallel printing for faster build part fabrication and higher throughput.

In an exemplary embodiment, the lasers 202 may have an irradiance of from about 1 W/cm$^2$ to about 10,000 W/cm$^2$. For example, any one or more of the lasers 202 may have an irradiance of from about 1 W/cm$^2$ up to 1,000 W/cm$^2$, about 2,000 W/cm$^2$, about 3,000 W/cm$^2$, about 4,000 W/cm$^2$, or about 4,500 W/cm$^2$ to about 5,500 W/cm$^2$, about 6,000 W/cm$^2$, about 7,000 W/cm$^2$, about 8,000 W/cm$^2$, about 9,000 W/cm$^2$, or about 10,000 W/cm$^2$. It should be appreciated that much lower power lasers or laser arrays could also be used depending on the application, metal, configuration and spot size. It should further be appreciated that any one or more of the lasers 202 may include a combination of power and optical configurations, including collimated and non-collimated lasers, that may achieve the desired irradiance.

As further illustrated in FIG. 2, the monitoring system 130 may include a pyrometer 206 capable of or configured to measure a temperature of the substrate 116 or an area near or proximal the substrate 116. For example, the pyrometer 206 may be capable of or configured to measure an area at and/or proximal the substrate 116 heated by the lasers 202 of the targeted heating system 102. In another example, the pyrometer 206 may be capable of or configured to measure a temperature of the droplets from the printhead 104 or any other components of the 3D printer 200.

Figure 3:
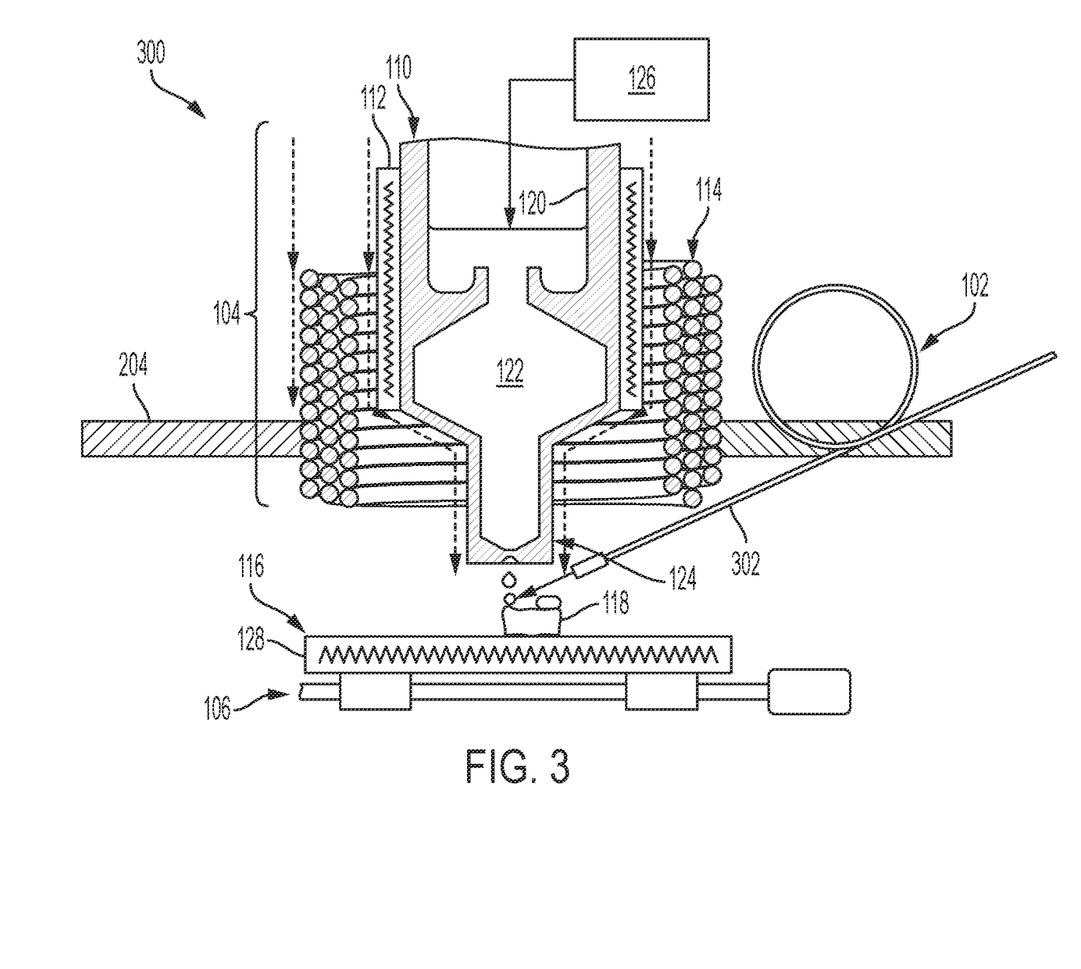
FIG. 3 illustrates a schematic view of another exemplary additive manufacturing layering device or 3D printer incorporating an exemplary targeted heating system, according to one or more embodiments.

FIG. 3 illustrates a schematic view of another exemplary additive manufacturing layering device or 3D printer 300 incorporating an exemplary targeted heating system 102, according to one or more embodiments. The 3D printer 300 illustrated in FIG. 3 may be similar in some respects to the 3D printers 100, 200 described above and therefore may be best understood with reference to the description of FIG. 1 or 2, where like numerals designate like components and will not be described again in detail.

As illustrated in FIG. 3, the targeted heating system 102 may include one or more fiber lasers 302, such as a fiber-coupled laser. As further illustrated in FIG. 3, the fiber laser 302 may be coupled with the printhead 104 via the mount 204. The fiber laser 302 of the targeted heating system 102 may be or include any suitable fiber laser 302 capable of or configured to sufficiently heat the substrate 116 and/or an area proximal the substrate 116. In at least one embodiment, the fiber laser 302 utilized may be at least partially dependent on the build material, such as the type of metal being deposited to fabricate the article 118. In another embodiment, the fiber laser 302 utilized may at least partially depend on a rate at which the drops are deposited on the substrate 116 or the deposition rate.

The fiber laser 302 may be capable of or configured to output a continuous wave (CW). The fiber laser 302 may also be capable of or configured to output a pulsed wave beam. The fiber laser 302 may be polarized or unpolarized. The output light of the fiber laser 302 may be delivered by an optical single mode or an optical multimode output fiber. The output light of the fiber laser 302 may be collimated and/or shaped with an external optical system. The fiber laser 302 may be capable of or configured to operate at high ambient temperatures, such as temperatures of the 3D printers described herein. In at least one embodiment, at least a portion of the fiber laser 302 may be cooled, such as water-cooled. In yet another embodiment, at least a portion of the fiber laser 302 may be located outside a high temperature area of the 3D printers described herein. For example, at least a portion of the fiber laser 302 may be disposed in an area having temperatures of less than 550° C., less than 400° C., less than 300° C., or less than 200° C. It should be appreciated that the operating temperatures of the 3D printer may at least partially depend on the metal being deposited.

The fiber laser 302 may provide or form a laser or an output having a wavelength of from about 600 nm to about 1200 nm. Though, it should be appreciated that other wavelengths could be used as they become commercially available from laser suppliers and manufacturers. For example, the output from the fiber laser 302 may be from about 600 nm, about 700 nm, about 750 nm, about 780 nm, or about 800 nm to about 850 nm, about 900 nm, about 950 nm, about 1000 nm, about 1050 nm, about 1070 nm, about 1100 nm, about 1150 nm, or about 1200 nm.

Figure 4:
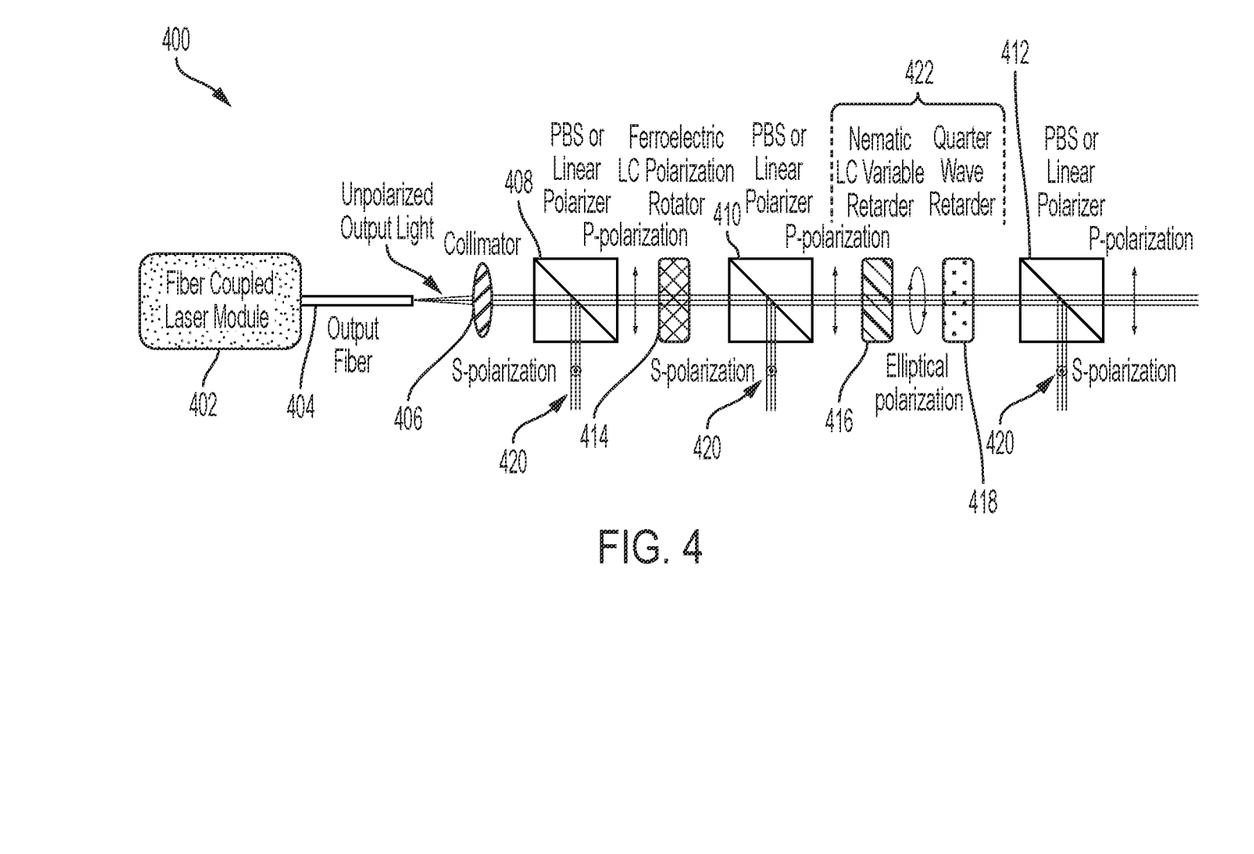
FIG. 4 illustrates an exemplary fiber coupled laser that may be utilized as part of the laser system of the targeted heating system of FIG. 2, FIG. 3, FIG. 7, or FIG. 8, according to one or more embodiments disclosed.

FIG. 4 illustrates an exemplary laser system 400 that may be utilized in place of the fiber laser 302 of the targeted heating system 102 of FIG. 3, according to one or more embodiments. The laser system 400 illustrated in FIG. 4 may be utilize a fiber coupled laser. The laser system 400 may include a fiber coupled laser module 402, an output fiber 404, one or more collimators (one is shown 406), one or more polarizers (three are shown 408, 410, 412), one or more polarization rotators (one is shown 414), one or more variable retarders (one is shown 416), one or more wave retarders (one is shown 418), or combinations thereof. In an exemplary embodiment, the laser system 400 may consist of or consist essentially of the fiber coupled laser module 402, the fiber output 404, the collimator 406, the one or more polarizers 408, 410, 412, the polarization rotator 414, the variable retarder 416, and the wave retarder 418.

The one or more polarizers 408, 410, 412 may be or include, but are not limited to, a polarizing beam splitter (PBS), a linear polarizer, or combinations thereof. The polarization rotator 414 may be or include, but is not limited to, a ferroelectric liquid crystal polarization rotator. The variable retarder 416 may be or include, but is not limited to, a nematic liquid crystal (LC) variable retarder. The wave retarder 418 may be or include, but is not limited to, a quarter wave retarder.

As illustrated in FIG. 4, the fiber coupled laser module 402 may be coupled with the output fiber 404. The fiber coupled laser module 402 and the output fiber 404 coupled therewith may be capable of or configured to generate and output unpolarized light or laser. The collimator 406 may be disposed downstream of the output fiber 404. The one or more polarizers 408, 410, 412 may be disposed downstream of the collimator 406. For example, as illustrated in FIG. 4, a first polarizer 408, a second polarizer 410, and a third polarizer 412 may be disposed downstream of the collimator 406. The polarization rotator 414 may be disposed downstream any one or more of the polarizers 408, 410, 412 and/or upstream any one or more of the polarizers 408, 410, 412. For example, as illustrated in FIG. 4, the polarization rotator 414 may be interposed between the first polarizer 408 and the second polarizer 410. In another embodiment, further described herein, the polarization rotator 414 may be interposed between the second polarizer 410 and the third polarizer 412. The variable retarder 416 may be disposed upstream of the wave retarder 418. Similarly, the wave retarder 418 may be disposed downstream the variable retarder 416. In at least one embodiment, the variable retarder 416 and the wave retarder 418 may be disposed downstream any one or more of the polarizers 408, 410, 412 and/or upstream any one or more of the polarizers 408, 410, 412. For example, as illustrated in FIG. 4, the variable retarder 416 and the wave retarder 418 may be interposed between the second polarizer 410 and the third polarizer 412.

In at least one embodiment, the polarization rotator 414, which may be a ferroelectric LC polarization rotator, may be operably coupled with any one or more of the polarizers 408, 410, 412 (e.g., PBS or linear polarizer) to form a liquid crystal shutter. The combination of the polarization rotator 414 and the one or more of the polarizers 408, 410, 412 may form the liquid crystal shutter that may operate at about 50% duty cycle with about 100 microsecond rise and fall times. The liquid crystal shutter may modulate the beam "on" by allowing the beam to remain P-polarized and pass through the polarization beam splitter 408, 410, 412 or modulate the beam "off" by switching the beam to an S-polarized state; and thus, having it reflect off of the polarizers 408, 410, 412 into a beam dump 420.

The liquid crystal shutter formed from the polarization rotator 414 and any one or more of the polarizers 408, 410, 412 may be capable of or configured to have varying shutter speeds to thereby match a droplet rate of the printhead 104. Matching the droplet rate may allow the liquid crystal shutter to deliver the laser energy to the substrate 116 and/or an area proximal the substrate 116 just before or as the drop is deposited. The ability to vary or modify the shutter rate of the liquid crystal shutter may also reduce the amount of errors in the shutter rate.

In at least one embodiment, the variable retarder 416, which may be a nematic liquid crystal variable retarder, may be combined with the wave retarder 418, which may be a quarter-wave retarder, to form a nematic liquid crystal variable polarization rotator 422. In operation, the wave retarder 418 may be capable of or configured to convert elliptical polarization from the variable retarder 416 to form linear polarization.

The nematic liquid crystal variable polarization rotator 422 may be operably coupled with any one or more of the polarizers 408, 410, 412. The combination of the nematic liquid crystal variable polarization rotator 422 and any one or more of the polarizers 408, 410, 412 may be capable of or configured to change an amplitude and/or power level of the laser directed to the article 118 (see FIGS. 1-3). The nematic liquid crystal variable polarization rotator 422. It should be appreciated that a drive current directed to the fiber coupled laser module 402 may also be adjusted to modulate the output power level of the laser system 400.

The laser system 400 may include one or more additional accessories and/or optics capable of or configured to adjust, focus, and/or shape a beam profile thereof. The beam profile may have a Gaussian, Top-Hat, or multimode profile. Illustrative accessories may be or include, but are not limited to, lenses, axicons, collimators, phase plates, beam expanders, or the like, or combinations thereof.

Figure 5:
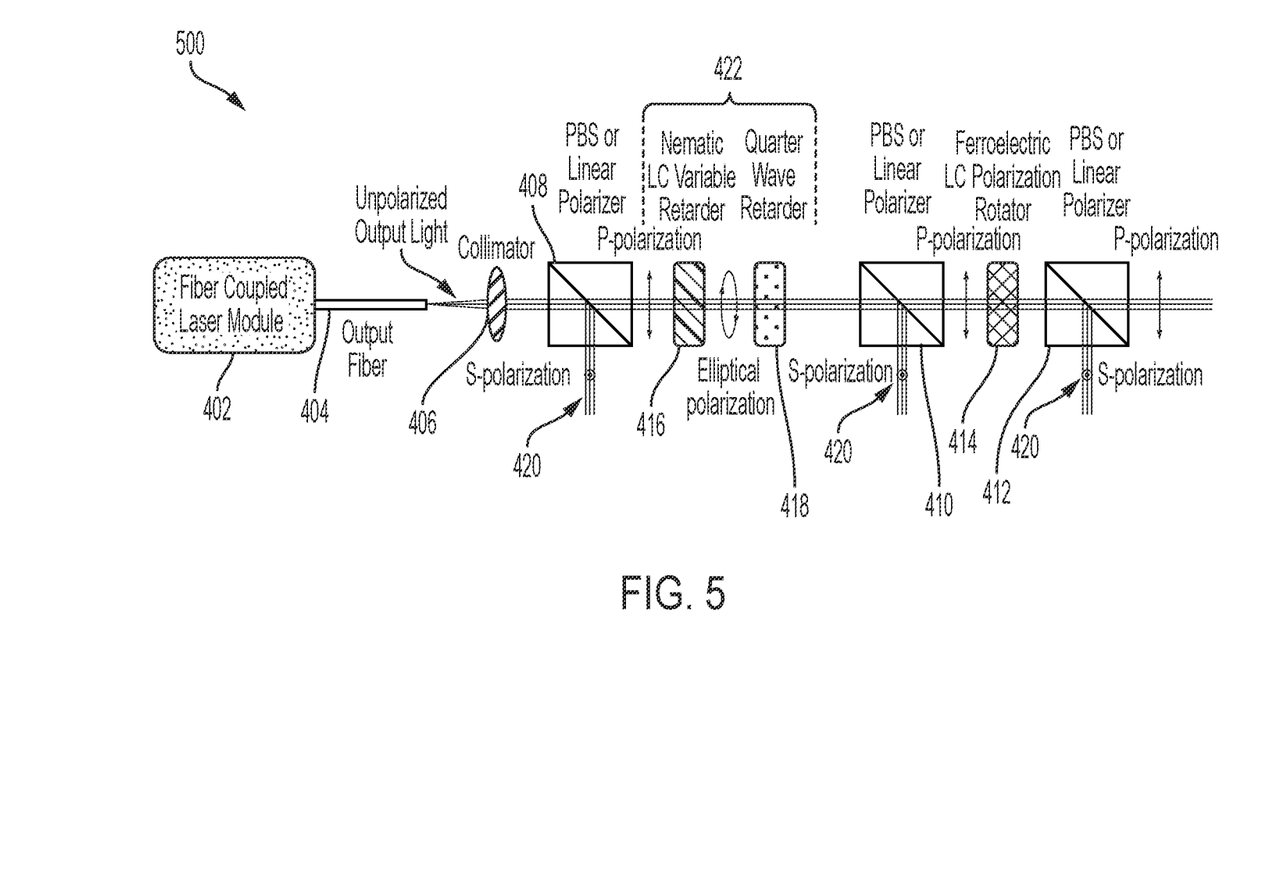
FIG. 5 illustrates another exemplary fiber coupled laser that may be utilized as part of the laser system of the targeted heating system of FIG. 2, FIG. 3, FIG. 7, or FIG. 8, according to one or more embodiments disclosed.

FIG. 5 illustrates another exemplary laser system 500 that may be utilized in place of the fiber laser 302 of the targeted heating system 102 of FIG. 3, according to one or more embodiments. The laser system 500 illustrated in FIG. 5 may be similar in some respects to the laser system 400 described above and therefore may be best understood with reference to the description of FIG. 4, where like numerals designate like components and will not be described again in detail.

As illustrated in FIG. 5, the laser system 500 may include components similar to the laser system 400 illustrated in FIG. 4. The nematic liquid crystal variable polarization rotator 422 of the laser system 500, however, is interposed between the first polarizer 408 and the second polarizer 410. Further, the polarization rotator 414 is interposed between the second polarizer 408 and the third polarizer 412.

It should be appreciated that any one or more of the lasers described herein may be substituted or used in conjunction with other types of laser such as gas lasers, diode lasers, VCSELs, diode laser arrays, VCSEL arrays, diode-pumped solid state lasers, lasers in the near UV wavelength range (i.e., violet and blue) or visible wavelength range can also be used, or the like, or combinations thereof.

Adhesion of the 3D printed part or article 118 to the build plate or platen 128 must be strong enough to keep the part from separating from the build plate or platen 128. During the printing process, the build part 118 experiences shearing forces caused by accelerations due to direction changes and speed changes as the part 118 is moved under the printhead 104. On the other hand if the adhesion between the 3D printed part 118 and build plate 128 is too strong, secondary machining operations must be performed to cut or remove the part 128 from the build plate. Secondary operations increase cost and reduce productivity. Therefore, another use of the targeted heating systems 102 disclosed herein is to deliver laser energy to the localized area of the build plate 128 where the next molten metal droplet will be deposited to promote stronger adhesion or produce weaker adhesion depending on what is needed for the particular deposited metal type and build plate 128 coating or material. For example a higher local build plate temperature could induce greater wetting of the droplet onto the surface of the build plate 128 to increase adhesion. For some materials increasing the temperature would produce more oxidation on the droplet surface and decrease the adhesion. This would effectively create a release layer that can be used to separate the 3D printed part 118 from the build plate 128 by applying a shearing mechanical shock or a thermal shock. This would eliminate the need for secondary operations to remove the part 118 from the build plate 128.

Figure 6:
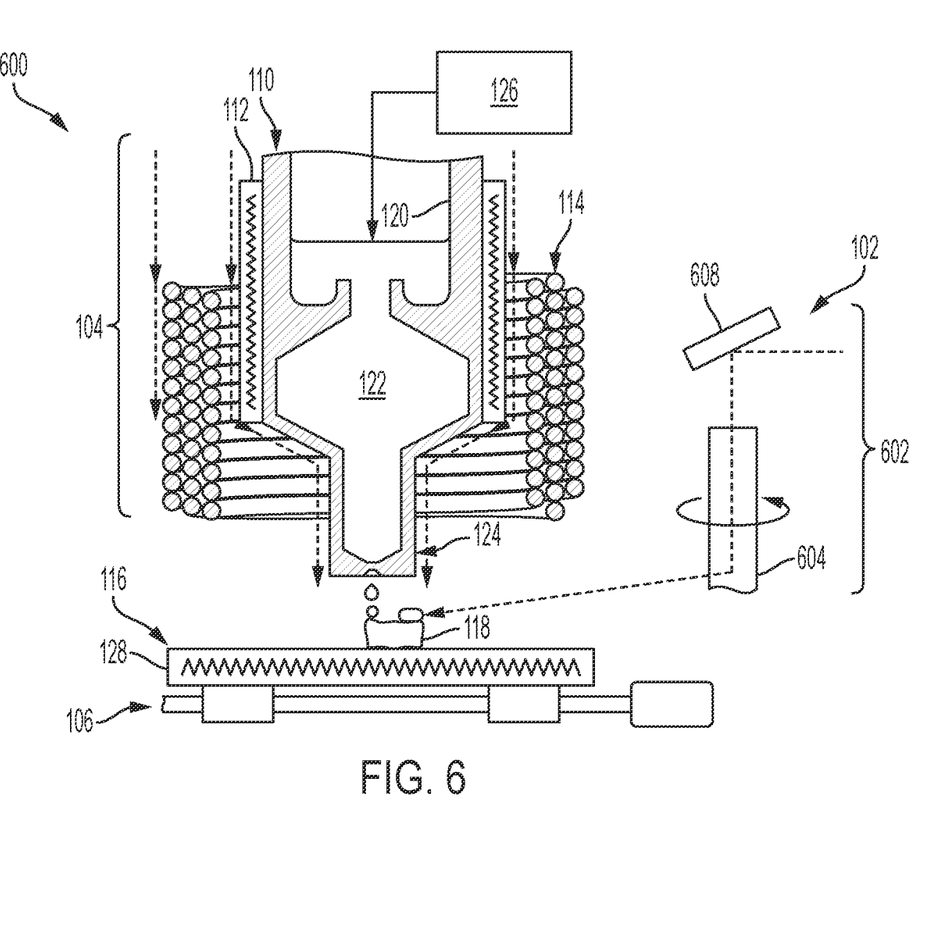
FIG. 6 illustrates a schematic view of another exemplary additive manufacturing device or 3D printer incorporating the exemplary targeted heating system, according to one or more embodiments disclosed.

FIG. 6 illustrates a schematic view of another exemplary additive manufacturing device or 3D printer 600 incorporating the exemplary targeted heating system 102, according to one or more embodiments. The 3D printer 600 illustrated in FIG. 6 may be similar in some respects to the 3D printers 100, 200, 300 described above and therefore may be best understood with reference to the description of the respective Figures, where like numerals designate like components and will not be described again in detail.

As illustrated in FIG. 6, the targeted heating system 102 may include one or more monogon systems (one is shown 602). The monogon system 602 may be capable of or configured to sufficiently heat the substrate 116 and/or an area proximal the substrate 116. In at least one embodiment, the monogon system 602 and/or the components thereof utilized may be at least partially dependent on the build material, such as the type of metal being deposited to fabricate the article 118. In another embodiment, the monogon system 602 and/or the components thereof utilized may at least partially depend on a rate at which the drops are deposited on the substrate 116 or the deposition rate.

The monogon system 602 may include one or more monogon scanners (one is shown 604), one or more mirrors (one is shown 608), or combinations thereof. The mirror 608 may be capable of or configured to receive an output source, such as a high power laser beam, and reflect or redirect the output source to the monogon scanner 604. The monogon scanner 604 may be capable of or configured to receive the output source from the mirror or another source and reflect or redirect the output source to the substrate 116 and/or an area proximal the substrate 116.

Any suitable monogon scanner 604 may be utilized. In at least one embodiment, illustrated in FIG. 6, the monogon scanner 604 may be or include a rotating monogon total internal reflection (TIR) scanner capable of or configured to be rotated about an axis (e.g., vertical axis) thereof. The monogon scanner 604 may be rotated about the axis to direct or control a position of the output beam on the substrate 116 and/or an area proximal the substrate 116. Illustrative monogon scanners 604 may be or include, but are not limited to, a fused silica monogon optical scanner, or the like. The monogon scanner 604 may be capable of or configured to scan greater than 360° in azimuth by axial rotation of the monogon scanner 60. The monogon scanner 604 may also be capable of or configured to scan about 20° in altitude when utilized with the mirror 608 (e.g., galvo mirror). The monogon scanner 604 may be capable of or configured to operate under high ambient temperatures of from about 300° C. or 500° C. to about 1200° C., or about 600° C. to about 1000° C. The monogon scanner 604 may be capable of or configured to operate with high laser powers (e.g., 1W to several kW).

In at least one embodiment, the monogon scanner 604 may be free or substantially free of a coating, such as a reflective coating or an anti-reflection coating. It should further be appreciated that the monogon system 602 may utilize a source of output (e.g., laser source or optical beam) outside of the high temperature area of the 3D printer 600. While FIG. 6 illustrates a single monogon system 602, it should be appreciated that a plurality of monogon systems 602 may be independently operated to heat the substrate 116 and/or the area proximal the substrate 116.

In an exemplary operation of the 3D printer 100, with continued reference to FIG. 1, the stage 106 and the substrate 116 may be configured to move with one another relative to the printhead 104 in the x-axis, y-axis, and/or the z-axis. For example, the stage 106 and the substrate 116 may be configured to move with one another in the x-axis, y-axis, and the z-axis while the printhead 104 remains stationary. In another example, the printhead 104 may be configured to move in the x-axis, y-axis, and the z-axis while the stage 106 and the substrate 116 are stationary. In yet another example, the printhead 104 may move in the z-axis and the stage 106 and the substrate 116 may move in the x-axis and the y-axis.

Similarly, the stage 106 and the substrate 116 may move in the z-axis while the printhead 104 may move in the x-axis and the y-axis.

The printhead 104 may direct droplets of the build material along a build path on the platen 128 or substrate 116 to form the article 118 drop by drop in a layer by layer manner. The time between the current jetted drop and the previously jetted drop that the current jetted drop will coalesce with may vary while moving along the build path, which may be at least partially determined by a shape and/or design of the article 118. The current jetted drop may be directed on a previously jetted drop, which may be surrounded by varying amounts of previously jetted material (e.g., below and/or adjacent). As such, it should be appreciated that the current and/or the previously jetted drops may be maintained at varying temperatures. For example, heat conduction pathways may at least partially depend on the shape and/or design of the article 118. As such, the temperature of the previously jetted drops and/or the current jetted drops may be maintained at different temperatures. In operation, the targeted heating system 102 may be capable of or configured to adjust a temperature of the substrate 116 and/or an area proximal the substrate 116. The targeted heating system 102 may be operated to be at least partially dependent on one or more of a time difference between previous and current droplets of the build material, heat conduction differences along varying portions of the article 118, the build path, the type of build material utilized, or combinations thereof.

In at least one embodiment, the energy or power of the targeted heating system 102 may be determined a priori from one or more of the following: shape and/or design of the article 118, the build path along with the layers of the article 118 are formed or printed, the thermal environment, material parameters, printing parameters utilized, or combinations thereof. Illustrative printing parameters may be or include, but are not limited to, drop frequency, drop temperature, platen 128 temperature, or combinations thereof. In an exemplary embodiment, the energy or power of the targeted heating system 102 may be determined according to Formula (1):

$$\text{Laser Power}(t) = A_1(t) + A_2(t) \cdot \Delta t + A_3(t) \cdot x\text{-position}(t) + A_4(t) \cdot y\text{-position}(t) + A_5(t) \cdot z\text{-position}(t) + \Sigma B_i(t) \cdot \text{print parameter}(t)_i + \Sigma C_j(t) \cdot \text{material parameter}_j + \Sigma D_k(t) \cdot \text{environmental parameter}(t)_k + \ldots \quad (1),$$

where:
$A_1, A_2, A_3, \ldots A_N$ are coefficients or weights for various part geometry parameters;
$B_1 \ldots B_N$ are coefficients or parameter weights for various print process parameters;
$C_1 \ldots C_N$ are coefficients or parameter various material parameters;
$D_1 \ldots D_N$ are coefficients or parameter various environmental parameters;
$\Delta t$ is the time between previously deposited material or droplet and the next droplet;
x-position is the x coordinate of a particular point of a build part or article relative to the build plate or other coordinate system origin;
y-position is the y coordinate of a particular point of a build part or article relative to the build plate or other coordinate system origin; and z-position is the z coordinate of a particular point of a build part or article relative to the
build plate datum or other coordinate system origin.

The parameters or printer parameters may be or include, but are not limited to, initial droplet temperature, build plate or platen temperature, drop frequency, initial droplet ejection height, laser wavelength, or the like, or combinations thereof. Material parameters may be or include, but are not limited to, melting temperature, light absorption coefficient, density, specific heat, thermal conductivity, enthalpy, solidus temperature, liquidus temperature, or the like, or combinations thereof. Environmental parameters may be or include, but are not limited to, ambient temperature, humidity, sheath gas concentration, or the like, or combinations thereof. It should be appreciated that other or additional parameters and weights may be used in the equation to further optimize and refine the amount of the laser power or energy to the build part or article 118 and/or the build plate 128.

The heat provided by the targeted heating system 102 and directed to the substrate 116 and/or an area proximal the substrate 116 may be utilized to heat, soften, remelt, or any combination thereof, previously and/or current drops or layers of the build material. The heat provided by the targeted heating system 102 may also be capable of or configured to affect a thermal gradient of the melt pool of the droplets during cooling to control various features of the article 118. For example, the heat provided by the targeted heating system 102 may affect one or more of build strength, adhesion, porosity, surface finish, crack and/or fracture formation, grain size, grain orientation, structure, or the like, in the article 118.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An additive manufacturing device for fabricating an article, comprising:
   a stage configured to support a substrate;
   a printhead disposed above the stage, the printhead configured to heat a build material to a molten build material and deposit the molten build material on the substrate as droplets to fabricate the article; and
   a targeted heating system disposed proximal the printhead, the targeted heating system configured to control a temperature or temperature gradient of the droplets deposited on the substrate, an area proximal the substrate, or combinations thereof,
   wherein the targeted heating system comprises a monogon system, the monogon system comprising one or more monogon scanners, one or more Galvo mirrors, or combinations thereof.

2. The additive manufacturing device of claim 1, wherein the printhead and the targeted heating system are coupled with one another.

3. The additive manufacturing device of claim 1, wherein the targeted heating system further comprises one or more lasers.

4. The additive manufacturing device of claim 3, wherein the one or more lasers comprise an irradiance of from about 1,000 W/cm² to about 10,000 W/cm².

5. The additive manufacturing device of claim 3, wherein the one or more lasers comprise a laser imager.

6. The additive manufacturing device of claim 5, wherein the laser imager comprises a 1D imager or a 2D imager.

7. The additive manufacturing device of claim 1, wherein the targeted heating system is configured to operate at temperatures of from greater than or equal to about 300° C. to less than or equal to about 600° C.

8. The additive manufacturing device of claim 1, wherein the targeted heating system further comprises a laser system.

9. The additive manufacturing device of claim 8, wherein the laser system comprises:
   a fiber laser;
   a fiber coupled laser module;
   an output fiber coupled with the fiber coupled laser module;
   a collimator disposed downstream of the fiber output;
   a polarization rotator disposed downstream of the collimator;
   a variable retarder disposed downstream of the collimator; and
   a wave retarder disposed downstream of the variable retarder.

10. The additive manufacturing device of claim 9, further comprising:
    a first polarizer disposed between the collimator and the polarization rotator;
    a second polarizer disposed between the polarization rotator and the variable retarder; and
    a third polarizer disposed downstream of the wave retarder.

11. The additive manufacturing device of claim 10, wherein the polarization rotator is disposed upstream of the variable retarder and the wave retarder.

12. The additive manufacturing device of claim 9, further comprising:
    a first polarizer disposed between the collimator and the variable retarder;
    a second polarizer disposed between the wave retarder and the polarization rotator; and
    a third polarizer disposed downstream of the polarization rotator.

13. The additive manufacturing device of claim 12, wherein the variable retarder and the wave retarder are disposed upstream of the polarization rotator.

14. The additive manufacturing device of claim 1, wherein the monogon system comprises a monogon scanner, and wherein the monogon scanner is substantially free of a reflective coating.

15. The additive manufacturing device of claim 1, further comprising a monitoring system configured to monitor a portion of the additive manufacturing device.

16. The additive manufacturing device of claim 15, wherein the monitoring system comprises a pyrometer configured to measure a temperature of the substrate, the area proximal the substrate, or combinations thereof.

17. The additive manufacturing device of claim 1, further comprising:
    a computing system operably coupled with the printhead and the targeted heating system; and
    a monitoring system operably coupled with the computing system and configured to monitor the additive manufacturing device.

18. The additive manufacturing device of claim 1, wherein the build material comprises one or more metals or metal alloys.

19. The additive manufacturing device of claim 18, wherein the one or more metals or metal alloys comprise one or more of aluminum, an aluminum alloy, brass, bronze, chromium, a cobalt-chrome alloy, copper, a copper alloy, an iron alloy, nickel, a nickel alloy, a nickel-titanium alloy, stainless steel, tin, titanium, a titanium alloy, gold, silver, molybdenum, tungsten, or combinations thereof.

20. The additive manufacturing device of claim 1, wherein the build material comprises one or more polymers.

21. The additive manufacturing device of claim 20, wherein the one or more polymers comprise one or more of acrylonitrile butadiene styrene (ABS), polycarbonate (PC), polylactic acid (PLA), high density polyethylene (HDPE), polyphenylsulfone (PPSU), poly(meth)acrylate, polyetherimide (PEI), polyether ether ketone (PEEK), high impact polystyrene (HIPS), thermoplastic polyurethane (TPU), a polyamide, composites thereof, or combinations thereof.

22. The additive manufacturing device of claim 1, wherein the monogon system comprises the one or more monogon scanners and the one or more Galvo mirrors.

* * * * *